United States Patent Office 2,914,421
Patented Nov. 24, 1959

2,914,421

METHOD OF MANUFACTURING BANDAGES OR OTHER ADHESIVE PLASTER ARTICLES FOR SURGICAL, ORTHOPEDIC OR MEDICAL PURPOSES, AND ARTICLES IN ACCORDANCE WITH THOSE OBTAINED

Albert Wiener, Mulhouse, France, assignor to Manufacture de Bandes Platrees Adhesia, Mulhouse (Haut-Rhin), France, a company of France No Drawing. Application October 9, 1956
Serial No. 614,815

Claims priority, application France April 30, 1956

8 Claims. (Cl. 117—62)

The present invention relates to the manufacture, which can be advantageously effected continuously, of rolls or other adhesive plaster articles, for surgical, medical, orthopedic and other purposes, by employing natural gypsum ($CaSO_4 \cdot 2H_2O$) as a raw material.

It is known to manufacture plastered articles for surgical, orthopedic and medical purposes, from plaster spread on a foundation.

A first known method consists of sprinkling plaster on a foundation such as absorbent gauze, spreading this plaster on the foundation by rubbing, and then rolling the bandage thus loaded, which is then ready for use.

According to another known method using plaster as a raw material, a coating is made with plaster, by mixing it either with water, or organic solvents, and adding an agglutinant. The coating is then spread, in a thin layer, on a foundation, by a suitable device; the assembly is put through an oven, which acts by transmission, convection and heat radiation, to evaporate the water or the organic solvents. Thus, plastered bandages are obtained, called "adhesive plaster bandages," which are characterized by the fact that the plaster, thanks to the adhesive employed, adheres firmly to the foundation used, and by the fact that these bandages can be handled without an appreciable loss of plaster. Moreover, they can act as dressings, which, while being lighter than those obtained by sprinkling, have a much greater mechanical strength.

Nevertheless, this method has the disadvantage of being very expensive.

Other methods are also known which consist of spreading a pasty mass of finely molded gypsum on a foundation strip, comprising a moistening adhesive agent such as polyvinylic alcohol, the bandage then being subjected to such temperature conditions that a mixture is finally obtained formed of plaster, sulphate of lime in a semi-hydrated condition, and unaltered gypsum. The treating of bandages with infra-red rays has been contemplated, which affords several advantages, more particularly a homogeneous dehydration right through the product treated and an easy mixing of the proportion of the constituents derived from the gypsum in the midst of the coating spread on the foundation.

In spite of lengthy and costly attention to the details of this method, dealing more particularly with the study of the foundation gauzes (number of threads in the warp and weft), of the most suitable size composition of the gypsum and the nature and proportion of adhesives employed, it has not been possible to secure optimum results.

Actually, it has been ascertained that the treatment alone by baking of the gypsum by means of infra-red rays, such as had been previously contemplated, does not, in itself, confer on the plastered articles properties that are required for their orthopedic, medical, surgical and other uses, namely, speed of setting, speed of drying and rigidity of the dressing after the plaster has set.

This is due to the following fact:

According to the conditions employed during the heating of the gypsum, calcium semi-hydrate is obtained, either in the form of its alpha modification, or its beta modification. These two modifications can be distinguished more particularly by the manner in which their conversion into gypsum takes place during setting; i.e., at the moment when, after mixing with an excess of water, they are reconverted into gypsum. Practice has shown that plaster objects manufactured by moldings with the alpha modification, set quicker, dry quicker and afford a greater resistance to crushing, than objects manufactured by moldings from the beta modification.

The infra-red ray baking process mentioned above, almost exclusively produces the semi-hydrate beta modification, i.e., the modification whose speed of setting, speed of drying and resistance to crushing after setting is not suitable for medical purposes.

Lastly, a method of manufacturing plastered bandages is known in which hydrated plaster is spread on a foundation stiffened by means of starch. On leaving the drying oven, the bandage is caused to circulate in a steam atmosphere, for the purpose of creating a thin gysum film on the surface of the layer of the coating, which will catalyze setting when the bandage is applied and consequently increase the speed of setting. Nevertheless, the speeding up of setting is not very great, for the film of gypsum remains on the surface. This treatment in a steam atmosphere is not sufficient for bandages treated by infra-red rays, owing to the fact that anhydrite and semi-hydrate, on account of the penetrating action of the infra-red rays, forms right through the thickness of the coating spread on the foundation.

The present invention has the object of obviating the disadvantages of the methods mentioned above, with a view to obtaining bandages and other plastered articles that set rapidly, and are of the quality known as "surgical."

To this end, the invention relates to a method of manufacturing bandages or other articles for surgical, orthopedic or medical purposes, with adhesive plaster, characterized by the combination of the following operations:

(a) A coating with a basis of crude gypsum is spread on a foundation such as gauze, and this article is treated by baking by means of infra-red rays.

(b) The baked article is sprayed with water or saline solutions which, in the form of fine droplets, penetrate into the heart of the coating layer.

This combination of operations enables plastered articles to be obtained whose coating has a rapidly setting homogeneous structure.

This method can be operated continuously. It can be used for manufacturing very wide adhesive plaster bandages, for example, 120 to 140 centimeters wide, and of unlimited length. By conditioning these rolls, plastered spools, plastered bandages, plastered corsets, plastered splints, plastered cradles, etc. can be obtained.

The invention also applies to the characteristics hereinafter described and to their various possible combinations.

A method according to the invention is described hereinafter by way of non-restrictive example.

As stated above, this method comprises two principal stages:

(1) In the first, plastered bandages are prepared by baking a coating with a natural gypsum basis, spread on a foundation, by means of infre-red rays, whose setting speed is to slow for the orthopedic, surgical and medical purposes for which they are intended.

(2) The second stage of the method consists of increasing this setting speed and to bring it within the required limits, by spraying the bandages obtained by baking with infra-red rays, either with water or aqueous saline solutions.

This second stage of the method effects the conversion of the beta modification of the semi-hydrate into an alpha modification. Moreover, this treatment has the effect of bringing the soluble anhydrite or anhydrite III ($CaSO_4$) into the required proportion with regard to the calcium semi-hydrate ($CaSO_4 \frac{1}{2} H_2O$) and with regard to the natural gypsum of the mixture of these three products forming the plaster.

The two stages of this method are hereinafter described in a more detailed manner.

It was noticed that the success of baking gypsum by means of infra-red rays, in the form of a coating spread on a foundation, depends to a certain extent on the kind of gypsum employed and more particularly on its size composition fractionation, a gypsum powder containing too large a proportion of coarse grains giving a rapid setting but irregular plaster; on the other hand, a gypsum powder in which the proportion of small diameter grains is too great, gives a plaster whose setting is very much slower.

In order that the penetration of the infra-red rays and consequently the giving off of calories through the mass of the coating spread on the foundation, takes place in depth in as regular a manner as possible, and in order to obtain, at the conclusion of the operation, a plaster whose more or less lengthy setting speed, complies with the purpose in view, it is preferable that the gypsum powder employed for preparing the coating, should be made up by a mixture of powder of different size composition. The powder can more particularly be composed of a mixture having the following size composition:

| | Percent |
|---|---|
| Grains with a diameter exceeding $40\mu$ | 45 to 55 |
| Grains with a diameter comprised between 40 and $20\mu$ | 27.5 to 22.5 |
| Grains with a diameter less than $20\mu$ | 27.5 to 22.5 |

As compared with known methods of heating and baking, which act by transmission, convection and radiation of heat, the baking of gypsum by irradiation by means of infra-red rays affords the following advantages, more particularly if the size composition fractionation of the gypsum powder corresponds to the examples given above:

(1) The regulating of the intensity of irradiation in each section of the oven, and, owing to this fact, the regulating of the calorific effect, may be achieved in a very accurate manner;

(2) Thanks to the penetrating quality of the infra-red rays the action of the irradiation takes place in depth, and, owing to the slight thickness of the layer of the coating spread on the foundation, it acts in an identical manner right through the mass of the coating, so that the content of the plaster in semi-hydrate, anhydrite and unconverted gypsum is the same right through the layer of the spread coating;

(3) Moreover, drying and baking operations are effected in very short times, owing to the great energizing power of these rays.

The drying of the coating and the transforming of gypsum into plaster by means of infra-red rays may be effected either in the same oven, or in two ovens, the first being devoted to drying, the second to baking. The regulating of these ovens is effected either by maintaining constant, in the various sections of the ovens, the intensities of irradiation and by acting on the speed of passage of the bandage, or inversely, by maintaining this speed constant and by acting, during the operation, on the intensities of irradiations.

The power of irradiation intensities in the various sections of the oven or ovens, is a function of the construction of the ovens and the wave lengths of the infra-red rays employed. The regulating of irradiation in the section in which baking of the gypsum takes place should preferably be such that the temperature of the atmosphere in which the foundation loaded with the covering is enveloped is comprised between 160° and 190° centigrade, the effective temperature being selected—which is a known fact—as a function of the setting and hardening characteristics planned for the finished bandage.

So that the qualities of the plaster, which, at the end of the baking operation covers the absorbent gauze foundation, are rigorously identical right through the roll that has gone through the oven, it is advisable that, apart from the size composition of the gypsum specified above, two other conditions should be fulfilled:

(a) It is advisable that the coating applied to the absorbent gauze foundation on entering the oven, by means of a spreading device, should be the same height right across the width of the roll, so that the irradiation power of the infra-red rays takes place with the same intensity right through each section of the coating. Independent of the construction of the spreading system—which does not form part of the purpose of this invention—it has been observed that an absorbent bandage whose warp and weft are "drawn" and of which the distances between the threads of the warp, and the threads of the weft are suitably selected, gives excellent results.

(b) Moreover, it is advisable that throughout the spreading operation of the coating by the spreader, the fluidity of the coating should remain constant. The coating has a semi-pasty form; it is obvious that variations in the fluidity of the coating during the spreading operation would show themselves by variations in the thickness of the layer of coating in the unwinding direction of the absorbent gauze. Fluidity being a function of the temperature of the coating, it is advisable to maintain this temperature constant and within given limits. These limits, for coatings whose composition is given farther on, are comprised between about 25 and 30 degrees centigrade.

In its practical execution, the first operation of the method consists of preparing a coating, made of gypsum powder, whose size composition is within the limits mentioned above, by water and an agglutinant. According to the setting speed that is required at the conclusion of manufacture, a salt can also be added that acts as a setting accelerator.

It has been noticed that the proportions in which the principal ingredients enter into the composition of the coating exercise a decided action on the way in which the finished bandage behaves, when, for practical application, it is plunged into water. By employing cellulosic ethers such as methylcelluloses as an adhesive, whose agglutinating and spreading properties and suspension agents are known and used in many fields, their proportion must be selected with regard to the gypsum so that, in order that the coating covers the finished bandage, acquired, by immersion in water, the fluidity exactly corresponds to the purpose for which the bandage is intended to be used. It is thus possible to act on the fluidity of the coating of the adhesive plaster coated bandage acting during the preparation of the coating on the cellulosic adhesive-gypsum proportion. This cellulosic adhesive-gypsum proportion is, more over, a function of the size composition fractionation of the gypsum, and it is thus possible, by acting on this proportion, to counter-balance certain irregularities of the size composition, which may be evident in the same batch of gypsum powder. Lastly, it is possible to reduce the quantity of adhesive by simultaneously employing two cellulosic ethers, which differentiate by their degree of substitution, and hence, by their solubility in water.

According to one practical form of embodiment, a coating is made up with the following composition:

| | |
|---|---|
| Gypsum powder kilograms | 50 |
| Water do | 25 |
| Easily soluble methylcellulose grams | 670 |

The adhesive is previously dissolved in water and the gypsum added by degrees, continually stirring so as to effect a homogeneous suspension. The coating is spread on a foundation (such as absorbent gauze) by means of any kind of device, and the whole is subjected for drying and baking, to irradiation action by infra-red rays, in a suitably constructed oven. Bandages are thus obtained whose coating, after immersion in water for practical application, flow freely.

The two following formulas, for two coatings, said formulas being given by way of example, provide bandages whose coating, after immersion in water, flows slightly:

|  | A | B |
|---|---|---|
| Gypsum _____ kg__ | 50 | 50 |
| Water _____ kg__ | 25 | 25 |
| Methylcellulose, slightly soluble in water ____ g__ | 650 | 530 |
| Methylcellulose, easily soluble in water ____ g__ |  | 100 |

In continuous manufacture, the length of the adhesive plaster rolls and whose width is, for example, from 120 to 140 centimeters, is added to the length of the absorbent gauze rolls. It is possible to carry on baking without interruption during one, two or three work shifts.

The second stage of the method according to the invention, consists, as mentioned above, of spraying the plastered article with water or saline solutions, in the form of fine droplets, partially to convert the $\beta$ modification into the $\alpha$ modification and to convert part of the soluble anhydrite into pure gypsum.

By baking the aqueous coating, spread in a thin film on the absorbent strip with a "drawn" warp and woof, by means of infra-red rays, we obtain a plaster that is formed, for the most part, by the beta modification of calcium semi-hydrate, and into whose composition there enters, alongside an insignificant quantity of unconverted natural gypsum, a certain quantity of soluble anhydrite. This forming of soluble anhydrite is impossible to avoid, owing to the very powerful energizing action of the infrared rays.

It has been observed that by subjecting rolls of plastered bandages, after leaving the oven, to suitable treatment under given conditions, it is possible to convert the beta modification of calcium semi-hydrate into the alpha modification, and to diminish the quantity of soluble anhydrite into anhydrite III, which product acts as a setting restrainer.

It is known, as already stated, that the setting speed of adhesive plaster coated bandages can be increased by making the bandage circulate, after leaving the oven, in a steamy atmosphere, in order to create a thin film of gypsum on the surface of the layer of coating, which will catalyze setting when the bandage is applied.

In the present case, a treatment of this kind would not be sufficient, seeing that the raw material, which is natural gypsum, in view of the penetrating action of the infra-red rays, is converted not only on the surface of the coating, but right through its thickness into beta semi-hydrate and soluble anhydrite only a very small part of the gypsum not undergoing conversion.

In the method forming the object of the invention, the conversion of beta semi-hydrate of calcium sulphate into alpha semi-hydrate is achieved, after baking, by spraying the bandage coming out of the oven with a shower of very fine droplets, by means of pure water or aqueous solutions, which contain setting accelerators, such as potassium, lithium, ammonium or magnesium sulphates, or potassium chloride or potassium oxalate. Moreover, such spraying converts into gypsum part or all of the soluble anhydrite distributed through the baked mass, this quantity being a function of the conditions under which spraying has been carried out. The spraying of the rolls after baking may be effected either immediately after leaving the oven, or after a more or less prolonged resting time.

According to whether pure water or a solution of setting accelerator is used for this spraying, and according to the nature of this accelerator and the concentration of its aqueous solution, it is possible to act within wide limits on the final setting speed of bandages.

Spraying of the bandages is effected with any kind of device, provided, nevertheless, that the water or aqueous solution is distributed in a very homogeneous manner throughout the bandage leaving the oven.

The following example is given by way of practical achievement.

Composition of the coating:
Gypsum _____ kg__ 50
Water _____ kg__ 25
Easily soluble methylcellulose _____ g__ 530
Less soluble methylcellulose _____ g__ 100
Potassium sulphate _____ g__ 140

The coating is spread at a temperature comprised, for example, between 26° and 28° centigrade. The roll is dried and baked by means of infra-red rays, under the conditions stated above, the temperature of the atmosphere surrounding the bandage being, by way of example, 184° centigrade. The roll is then sprayed with an aqueous solution which contains, for example, 120 g. of potassium sulphate per liter, at the rate of 5.3 g. of solution per 100 g. of bandage leaving the oven. The setting of the bandage sprayed takes place in 6 minutes, as compared with 16 minutes, which is the setting speed of a non-sprayed bandage.

By spraying the same baked bandage, which took 16 minutes to set, with a lesser quantity of potassium sulphate solution, being 4.8 g. of solution per 100 g. of bandage leaving the oven, the setting of the bandage takes place in 10 minutes; in this case a certain quantity of anhydrite not having been converted into gypsum.

By this treatment, which also had the effect of converting the beta modification of calcium semi-hydrate into the alpha modification, the resistance of dressings made with plastered bandages, obtained by conditioning plastered rolls, is, after setting and after a rest period of 6 hours at a temperature of 25° centigrade, about 6 to 6.5 kg./m.$^2$, the test of resistance to crushing being carried out by means of a laboratory device.

Obviously, the invention is not restricted to the numerical data given above, which have only been mentioned by way of non-restrictive example.

The invention also relates to plastered articles in accordance with those obtained by the method described or a similar method, and more particularly plastered bandages, plastered cradles, and the like.

What I claim is:

1. Method of manufacturing adhesive plaster rolls and the like for surgical, orthopedic and like medical purposes, which consists of spreading on a foundation a coating having a crude gypsum base, treating the resulting coated foundation by baking by means of infra-red rays, removing the baked coated foundation from the presence of said rays, and without further application of heat spraying the baked coated foundation with a liquid selected from the group consisting of water and saline solutions which penetrate into the heart of the coating.

2. Method of manufacturing adhesive plaster rolls and the like for surgical, orthopedic and like medical purposes, which consists of mixing gypsum powders and adhesives, spreading on a foundation a coating having a crude gypsum base, treating the resulting coated foundation by baking by means of infra-red rays, removing the baked coated foundation from the presence of said rays, and without further application of heat spraying the baked coated foundation with a liquid selected from the group consisting of water and saline solutions which penetrate into the heart of the coating.

3. Method of manufacturing adhesive plaster rolls and the like for surgical, orthopedic and like medical purposes, which consists of mixing gypsum powders, an adhesive and a salt acting as a setting accelerator, spreading on a foundation a coating having a crude gypsum base, treating the resulting coated foundation by baking by means of infra-red rays, removing the baked coating foundation from the presence of said rays, and without further application of heat spraying the baked coated foundation with a liquid selected from the group consisting of water and saline solutions which penetrate into the heart of the coating.

4. Method of manufacturing adhesive plaster rolls and the like for surgical, orthopedic and like medical purposes, which consists of mixing gypsum powders of different size compositions with an adhesive powder, spreading on a foundation a coating having a crude gypsum base, treating the resulting coated foundation by baking by means of infra-red rays, removing the baked coated foundation from the presence of said rays, and without further application of heat spraying the baked coated foundation with a liquid selected from the group consisting of water and saline solutions which penetrate into the heart of the coating.

5. Method of manufacturing adhesive plaster rolls and the like for surgical, orthopedic and like medical purposes, which consists of mixing gypsum powders comprising the following size composition:

|  | Percent |
|---|---|
| Grains with a diameter exceeding $40\mu$ | 45 to 55 |
| Grains with a diameter comprised between 40 and $20\mu$ | 27.5 to 22.5 |
| Grains with a diameter less than $20\mu$ | 27.5 to 22.5 | with adhesive powders, spreading on a foundation a coating having a crude gypsum base, treating the resulting coated foundation by baking by means of infra-red rays, removing the baked coated foundation from the presence of said rays, and without further application of heat spraying the baked coated foundation with a liquid selected from the group consisting of water and saline solutions which penetrate into the heart of the coating.

6. Method of manufacturing adhesive plaster rolls and the like for surgical, orthopedic and like medical purposes, which consists of mixing adhesive powders of different solubilities with gypsum powders, spreading on a foundation a coating having a crude gypsum base, treating the resulting coated foundation by baking by means of infra-red rays, removing the baked coated foundation from the presence of said rays, and without further application of heat spraying the baked coated foundation with a liquid selected from the group consisting of water and saline solutions which penetrate into the heart of the coating.

7. Method of manufacturing adhesive plaster rolls and the like for surgical, orthopedic and like medical purposes, which consists of mixing gypsum powders and an adhesive, spreading on a foundation a coating having a crude gypsum base, treating the resulting coated foundation by baking by means of infra-red rays, removing the baked coated foundation from the presence of said rays, and without further application of heat spraying the baked coated foundation with a shower of fine droplets of a liquid selected from the group consisting of water and saline solutions which penetrate into the heart of the coating.

8. Adhesive plaster rolls and the like for surgical, orthopedic and like medical purposes produced by the method which consists of mixing gypsum powders and an adhesive, spreading on a foundation a coating having a crude gypsum base, treating the resulting coated foundation by baking by means of infra-red rays, removing the baked coated foundation from the presence of said rays, and without further application of heat spraying the baked coated foundation with a liquid selected from the group consisting of water and saline solutions which penetrate into the heart of the coating.

References Cited in the file of this patent

UNITED STATES PATENTS

| 2,009,597 | Weber | July 30, 1935 |
| 2,258,142 | Paddleford | Oct. 7, 1941 |
| 2,616,789 | Hoggatt | Nov. 4, 1952 |
| 2,655,148 | Eberl | Oct. 13, 1953 |

FOREIGN PATENTS

| 842,708 | France | June 19, 1939 |
| 1,023,794 | France | Mar. 24, 1953 |